United States Patent [19]
Schink et al.

[11] Patent Number: 5,536,791
[45] Date of Patent: Jul. 16, 1996

[54] WIRE COATINGS AND PROCESSES FOR THEIR PREPARATION

[75] Inventors: Michael Schink, Guilford, Great Britain; Gerold Schmidt; Klaus W. Lienert, both of Hamburg, Germany; Roland Peter, Mutterstadt, Germany

[73] Assignee: BASF Lacke + Farben, AG, Muenster-Hiltrup, Germany

[21] Appl. No.: 244,674

[22] PCT Filed: Dec. 1, 1992

[86] PCT No.: PCT/EP92/02776

§ 371 Date: Jun. 29, 1994

§ 102(e) Date: Jun. 29, 1994

[87] PCT Pub. No.: WO93/12188

PCT Pub. Date: Jun. 24, 1993

[30] Foreign Application Priority Data

Dec. 9, 1991 [DE] Germany .......................... 41 40 472.6

[51] Int. Cl.⁶ .......................... C08G 73/06; C08L 79/00
[52] U.S. Cl. .......................... 525/417; 525/428; 525/443; 525/502; 525/504; 525/540; 524/538; 524/602
[58] Field of Search ..................... 525/417, 428, 525/443, 540; 524/612, 538, 602, 607

[56] References Cited

U.S. PATENT DOCUMENTS

| | | | |
|---|---|---|---|
| 3,763,269 | 10/1973 | Formaini | 525/417 |
| 4,128,598 | 12/1978 | Makino et al. | 525/449 |
| 5,084,304 | 1/1992 | Lienert et al. | 524/538 |
| 5,093,459 | 3/1992 | Peter et al. | 528/170 |

FOREIGN PATENT DOCUMENTS

| | | |
|---|---|---|
| 0144281 | 11/1984 | European Pat. Off. . |
| 0237763 | 2/1987 | European Pat. Off. . |
| 0354500 | 8/1989 | European Pat. Off. . |
| 0410298A1 | 7/1990 | European Pat. Off. . |
| 0441047A2 | 12/1990 | European Pat. Off. . |
| 1811780 | 12/1967 | Germany . |
| 2728843A1 | 6/1976 | Germany . |

*Primary Examiner*—Tae Yoon
*Attorney, Agent, or Firm*—Anne Gerry Sabourin

[57] ABSTRACT

The present invention relates to wire coatings which contain a) 20 to 50% by weight of a tris-2-hydroxyethyl isocyanurate-modified polyester, b) 2 to 35% by weight of a bismaleimide resin, c) 0.1 to 3% by weight of a catalyst, preferably a titanate catalyst, and d) 35 to 77% by weight of organic solvents, with respect to the total weight of the wire coating, which is 100% by weight. The invention also relates to processes for the preparation of the wire coatings according to the invention.

7 Claims, No Drawings

WIRE COATINGS AND PROCESSES FOR THEIR PREPARATION

The present invention relates to wire coatings containing polyesters based on tris-2-hydroxyethyl isocyanurate, organic solvents, catalysts, auxiliaries and additives. The present invention also relates to a process for the preparation of these wire coatings.

Wire coatings based on polyester resins are known and are described, for example, in U.S. Patent Specification 3,342,780, in U.S. Patent Specification 3,249,578 and in EP-B-144 281. The polyol component used in the said publications is tris-2-hydroxyethyl isocyanurate. The use of tris-2-hydroxyethyl isocyanurate (THEIC) in this context leads to particularly high softening temperatures of the wire coating layer or to a particularly high thermal pressure (IEC 851-6). The wires coated with wire coatings based on polyester resins are distinguished by the fact that the coating film possesses good adhesion to copper wires.

The disadvantage of the wire coatings based on polyester resins compared with wire coatings based on polyester-imide resins or polyamide-imide resins is that the wires coated with polyester coatings have a low thermal shock. THEIC-modified polyester wire coatings are therefore used as "base coat", onto which, for example, a polyamide-imide wire coating is applied, in two-coat coatings for wires.

The object on which the present invention is based was to provide wire coatings which overcome the disadvantages associated with polyester wire coatings and thus improve the spectrum of properties of the THEIC-polyester wire coatings. Said wire coatings should be stable on storage, possess good adhesion to Cu wires and have as high as possible a thermal pressure as well as an adequate thermal shock. Moreover, the wire coatings should have as high as possible a solids content coupled with a viscosity favorable for processing. The surface quality of the coated wires should be improved, in particular with regard to the hardness characteristics.

This object is achieved by means of wire coatings containing polyester based on tris-2-hydroxyethyl isocyanurate (THEIC), organic solvents, catalysts, auxiliaries and additives, characterized in that the wire coatings contain a) 20 to 50% by weight of the THEIC polyester, b) 2 to 35% by weight of a bismaleimide resin, c) 0.1 to 3% by weight of a catalyst, preferably a titanate catalyst, and d) 35 to 77% by weight of organic solvents, with respect to the total weight of the wire coating, which is 100% by weight.

It is surprising and was not foreseeable that wire coatings which adhere very well to copper wires and which lead to coatings having outstanding technological properties can be obtained by modifying THEIC polyester wire coatings with bismaleimide resins.

The individual components of the wire coatings according to the invention are now first explained in more detail below.

The polyesters modified with tris-2-hydroxyethyl isocyanurate (THEIC) (component a)) are known and are described, for example, in U.S. Patent Specification 3,342,780 and EP-B-144 281. The polyesters are prepared in a known manner by esterification of polybasic carboxylic acids with polyhydric alcohols in the presence of suitable catalysts. The alcohol components used are, inter alia, tris-2-hydroxyethyl isocyanurate.

In place of the free acid, it is also possible to use ester-forming derivatives thereof.

Alcohols suitable for the preparation of the polyesters are, for example, ethylene glycol, 1,2- and 1,3-propylene glycol, 1,2-1,3- and 1,4-butanediol, 1,5-pentanediol, neopentyl glycol, diethylene glycol, triethylene glycol and also triols, such as, for example, glycerol, trimethylolethane, trimethylolpropane and tris2-hydroxyethyl isocyanurate. Mixtures of ethylene glycol and tris-2-hydroxyethyl isocyanurate are preferably used. The use of tris-2-hydroxyethyl isocyanurate leads to high softening temperatures of the coating layer.

Suitable carboxylic acids are, for example, phthalic acid, isophthalic acid, terephthalic acid and also the esterifiable derivatives thereof, such as, for example, the anhydrides, insofar as these exist, and the lower alkyl esters of the said acids, such as, for example, methyl, ethyl, propyl, butyl, amyl, hexyl and octyl phthalates, terephthalates and isophthalates. Both the half-esters and the dialkyl esters as well as mixtures of these compounds can be used. The corresponding acid halides of these compounds can also be used.

The amounts of the individual components are so chosen that the polyesters have a ratio of hydroxyl groups to carboxyl groups of from 1.1:1 to 2.0:1, preferably from 1.15:1 to 1.60:1.

Catalysts which are suitable for the preparation of the polyesters and which are used in amounts of from 0.01 to 5% by weight, with respect to the feed mixture, are conventional esterification catalysts, such as, for example, heavy metal salts, for example lead acetate and zinc acetate, and also organic titanates, for example tetra-n-butyl titanate, cerium compounds and also organic acids, such as, for example, p-toluenesulfonic acid.

Preferably, a polyester a) which is prepared from ethylene glycol, tris-2-hydroxyethyl isocyanurate and dimethyl terephthalate and has a hydroxyl number in the range from 80 to 150 mg KOH/g is used in the wire coatings according to the invention.

The bismaleimide resins used as component b) of the wire coatings according to the invention are understood to be resins or prepolymers containing bismaleimides as units. The bismaleimides are generally obtained from the bismaleimide units and comonomers (curing agents). The bismaleimide resins or prepolymers are formed by mixing and heating the bismaleimides and comonomers. Bismaleimide units correspond to the general formula

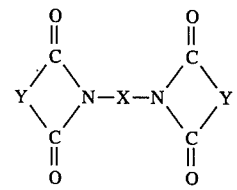

in which Y is an optionally substituted alkenyl group and X denotes a divalent radical containing at least two carbon atoms. Monomer bismaleimides are disclosed, for example, in DE-A-20 40 094, DE-A-27 19 903 and DE-A32 47 058.

Preferred bismaleimide units are 4,4'-bismaleimidodiphenylmethane, 4,4'-bismaleimidodiphenyl ether, 3,3'-bismaleimidodiphenyl sulfone, 1,3-bismaleimidobenzene, 2,4-bismaleimidotoluene, 1,6-bismaleimidohexane and 2,2,4-trimethyl-1,6-bismaleimidohexane. In addition to bismaleimides, polymaleimides and also mixtures of different bismaleimides can be used for the preparation of the bismaleimide resins. The bismaleimides can also contain up to 20% of a monoimide.

Suitable comonomers are alkenyl compounds, aromatic and aliphatic polyamines, polyphenols, aminophenols, vinyl compounds and allyl compounds. Polyamines suitable as comonomers are, for example, disclosed in DE-A-17 70 867; 4,4'-diaminodiphenylmethane, 4,4'-diaminodiphenyl sulfone, 4,4'-diaminodicyclohexylmethane and 3,3'-diaminodiphenyl sulfone are preferred. Usable polyphenols which may be mentioned are bisphenol A, bisphenol F or novolaks; others are listed in DE-A-24 59 925. Suitable alkenylphenols or alkenylphenol ethers are described in DE-A-26 27 045; o,o'-diallylbisphenol A is preferred. Oligomeric allyl- or propenyl-terminated sulfones or alkylated dicyclopentadienepolyphenols are also suitable. Usable aminophenols are, for example, m- or p-aminophenol. Examples of vinyl compounds and allyl compounds which may be mentioned are: styrene, divinylbenzene, diallyl phthalate, acrylates, methacrylates, diallylbenzene, alkenylphenols, alkenylphenol ethers, triallyl isocyanurate or vinylpyrrolidone. Vinyl compounds and allyl compounds, in particular diallylbisphenol A are preferred.

Suitable additives are, for example, fillers, such as chalk, kaolin, ground quartz, dolomite, barite, metal powders, aluminum oxide hydrate, cement, talc, kieselguhr and pigments, reinforcing fibers, such as glass, carbon, asbestos and cellulose fibers and also synthetic organic fibers, for example composed of polyethylene, polycarboxylic acid esters, polycarbonate or polyamides, inhibitors, such as hydroquinones, quinones, nitrobenzenes, N-nitroso compounds, salts of divalent copper and quaternary ammonium salts, polymerization initiators, such as benzoyl peroxide, methyl ethyl ketone peroxide, tert-butyl peroctoate, tert-butyl perbenzoate, cyclohexanone peroxide, acetylacetone peroxide, perketals, percarbonates, dicumyl peroxide, C-C-labile compounds and azo compounds, curing accelerators, for example copper, lead, calcium, magnesium or cerium octoates or naphthenates and in particular manganese and cobalt octoates or naphthenates; and also aromatic amines, such as dimethylaniline and diethylaniline, imidazoles, tertiary phosphines and organic acids, shrink-reducing polymers, such as polystyrene, polymethyl methacrylate, polyvinyl acetate, polyethylene, polybutadiene and graft copolymers, copolymers and also condensation polymers, such as saturated polyesters or polyester-urethanes, elastifying additives, for example rubber-like block copolymers and modified polytetrahydrofuran, and flame-retardant substances and plasticizers.

In order to prepare the bismaleimide resins b), the starting materials are mixed using conventional techniques and heated to temperatures of generally 70° to 190° C., a prepolymer forming with a rise in viscoisty, depending on the reaction time. Depending on the type of comonomer and amount of comonomer, a viscous solution or a glassy solidified solid is obtained after cooling and this is either ground or dissolved in a solvent, for example dimethylformamide or N-methylpyrrolidone. The preparation of the bismaleimide resins can also be carried out in a solvent.

Suitable bismaleimide resins are described, for example, in DE-A-38 27 120, DE-A-38 35 197 and DE-A39 24 867.

The solid, fusible bismaleimide resins disclosed in DE-A-39 24 867 are particularly preferentially used in the wire coatings according to the invention. The said resins are prepared from A) a bismaleimide of the formula

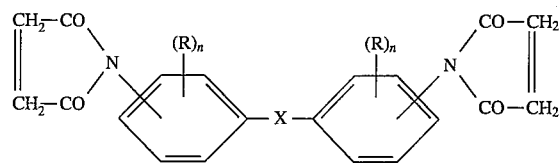

where
$X = CH_2$, O or $SO_2$,
$R = C_1-C_4$-alkyl, and
$n = 0$, 1 or 2,

B) an aminophenol of the formula

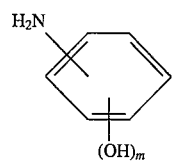

where $m = 1$ or 2, in a molar ratio of A):B) of 2.4:1 to 1.4:1, A) and B) prereacting to form a prepolymer, and also, optionally, C) 0 to 2% by weight, with respect to A)+B), of a secondary or tertiary amine or phosphine as addition catalyst, D) 0 to 1% by weight, with respect to A)+B), of a polymerization inhibitor, E) 0 to 25% by weight, with respect to A)+B), of a copolymerizable vinyl compound or allyl compound, F) 0 to 25% by weight, with respect to A)+B), of an epoxide resin containing at least 2 epoxide groups, and G) 0 to 2% by weight, with respect to A)+B), of a peroxide initiator, 70 to 90 mol-% of A) and 30 to 60 mol-% of B) being present in unreacted form and the remaining residue having reacted to form the prepolymer.

Suitable bismaleimides A) are the bismaleimide units already mentioned, 4,4'-methylene-bis-(N-phenylmaleimide) being preferably used.

Examples of suitable aminophenols B) are m-, o- and molar ratio of A):B) is between 2.4:1 and 1.4:1, preferably between 2.0:1 and 1.5:1 and in particular between 1.8:1 and 1.6:1.

Suitable catalysts C) are secondary or tertiary amines and phosphines Preferred amines are N,N,N',N'-tetramethyldiaminodiphenylmethane, N,N-dimethylaniline and dimethylbenzylamine or also imidazoles, such as, for example, 1-methylimidazole. Amongst the phosphines, triphenylphosphine is preferred.

The inhibitors D) used to prevent premature free radical polymerization of the double bond of the bismaleimide are customary, preferably phenolic, compounds, in particular hydroquinone or 2,6-dimethylhydroquinone in amounts of up to 1, preferably 0.1 to 0.5% by weight, with respect to the sum of A)+B).

Vinyl compounds and allyl compounds E) which are admixed in amounts of up to 25, preferably of from 5 to 20, % by weight, with respect to the sum of A)+B), are copolymerized as comonomers in the resin matrix during curing of the prepreg. They act as diluents to lower the resin viscosity, but, in particular, by means of suitable choice of the nature and amount of these additives, including in the form of mixtures of several vinyl compounds or allyl compounds, it is possible to adjust the tackiness of the prepreg in a targeted manner and to lower the softening point of the resin to room temperature. Monomers which contain two or three vinyl or allyl groups are preferred. Suitable compounds are, for example, N-vinylpyrrolidone, N-vinylcarbazole, divinylbenzene, acrylates, diallyl ethers, ethoxylated bisphenol A methacrylate, 3,3'-diallyl-bisphenol A, 3,3'-dipropenyl-bisphenol A and also reaction products of the diepoxide with acrylic acid or methacrylic acid, but in particular diallyl phthalate or prepolymers produced therefrom, triallyl cyanurate and triallyl isocyanurate.

Conventional epoxide resins F) in amounts of up to 25% by weight, with respect to A)+B), can also act as reactive diluents which are incorporated in the resin matrix.

0 to 2, preferably 0.01 to 2, % by weight, with respect to the sum of A)+B), of conventional peroxides which decompose into radicals at temperatures above 180° C. can be added as polymerization initiators G) in order to accelerate the curing process.

The mixture is heated to temperatures of between 140° and 190° C., preferably to 150°, to 180°, the components melting and bismaleimide and aminophenol reacting with one another. The dwell time of the reactants at these temperatures should be relatively short, preferably 1 to 10 and in particular 2 to 4 min. The reaction is continued until 70 to 90 mol-% of component A and 30 to 60 mol-% of component B are still present in unreacted form in the resulting bismaleimide resin. The degree of conversion can be controlled in a simple manner by means of the reaction temperature, reaction time and, where appropriate, by means of the nature and amount of the addition catalyst. The progress of the reaction can be monitored by rapid cooling and analytical determination of the unconverted starting components A)+B). In this context, high pressure liquid chromatography (HPLC) is used for quantitative determination of A+B in the resin mixture, the retention times and areas having been calibrated beforehand using the pure substances A and B. After terminating the reaction, the melt is cooled rapidly. The resin can be granulated or converted to flakes or powder.

With regard to further details on the preparation of the bismaleimide resins b) preferably used in the wire coatings according to the invention, reference is made to corresponding explanations in DE-A-39 24 867.

In addition, bismaleimide resins b) which contain

A) a bismaleimide,

B) a heterocyclic comonomer of the formula

R—Ar—O—Het—O—Ar—R where

R=an alkenyl or alkenyloxy group having 3–6 C atoms,

Ar=a phenylene, naphthylene or

 -radical where

X=O, S, SO$_2$, CO, C(R')$_2$ (R'=H, C$_1$–C$_6$-alkyl, CF$_3$ or phenyl) or a chemical bond, it being possible for Ar optionally to carry a hydroxyl group, and Het=a heterocyclic six-membered ring selected from the group comprising

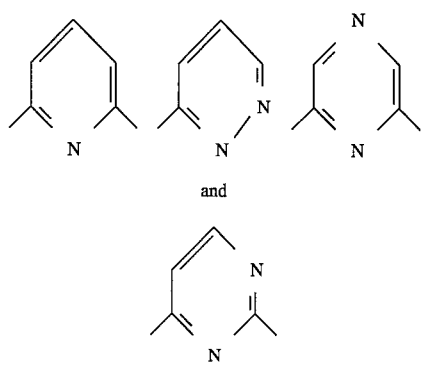

and

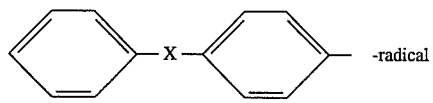

are particularly preferentially used in the wire coatings according to the invention. Bismaleimide resins of this type are described in DE-A-3,827,120.

Suitable comonomers B) are, for example, 2,6-bis-(3-allyl-4-hydroxyphenoxy) pyridine, 2,6-bis-(3-allyloxyphenoxy)pyridine, 2,6-bis-(4-allyl-3-hydroxyphenoxy)pyridine, 2,6-bis-[(3-allyl-4-hydroxyphenylisopropyl)-phenoxy]pyridine and the corresponding pyridazine derivatives. The heterocyclic comonomer particularly preferentially used is 2,6-bis-(2-propenylphenoxy)pyridine. Suitable preparation processes are described in DE-A-3,827,120.

With regard to suitable bismaleimide monomers, reference is made to the examples given above.

For preparation of the bismaleimide resins, the starting materials are mixed using the conventional techniques and heating to temperatures of between 70 and 190° C., a prepolymer being formed. Depending on the extent to which prepolymerization proceeds, a melt of relatively viscosity or a glassy solidified solid, which is ground or dissolved in a solvent, is obtained. The preparation of the resins can also be carried out in a solvent.

The mixing ratio for the reaction of the bismaleimide with the heterocyclic alkenyl compound can be chosen relatively freely, an equivalent ratio of 1 to 0.05 to 5 being preferable.

Further components can be added to the bismaleimide resins described. Suitable additive components are, for example, amines, preferably aromatic diamines (for example 4,4'-diaminodiphenylmethane) and aminophenols, which are also able to enter into an addition reaction with the maleimide double bonds. Prepolymers, for example of a bisimide and an amine, can also be used.

Further components which can be co-used in a proportion of up to 50% by weight, with respect to the mixture, are suitable vinyl monomers, for example styrene, α-methylstyrene, divinylbenzene, acrylic acid esters or methacrylic acid esters, diallyl phthalate, 3,3'-diallylbisphenol A, triallyl isocyanurate, triallyl cyanurate or vinylpyrrolidone.

With regard to further details, reference is made to corresponding explanations in DE-A-38 27 120. The bismaleimide resins disclosed in this published specification are preferably used since they have low softening points and a long gelling time, which facilitates processing in the melt state.

In addition to the bismaleimide resins described, a large number of further BMI resins are suitable for use in the wire coatings according to the invention.

The bismaleimide resins used in the wire coatings according to the invention are, for example, obtainable under the trade names Palimid® S from BASF AG, such as, for example, the bismaleimide resins Palimid® S 410 KR, Palimid® S 420 KR, Palimid® S 430 KR, Palimid® S 440 KR, Palamid® S 450 KR and Palimid® S 460 KR. Palimid®

S 410 KR, Palimid® S 430 KR and Palimid® S 440 KR (BASF AG) are particularly preferred.

Organic solvents (component d) which are suitable for the wire coatings according to the invention and which can also already be used for the preparation of the THEIC polyesters are cresol and non-cresol organic solvents, such as, for example, cresol, phenol, gylcol ethers, such as, for example, methyl glycol, ethyl glycol, isopropyl glycol, butyl glycol, methyl diglycol, ethyl diglycol and butyl diglycol; glycol ether esters, such as, for example, methyl glycol acetate, ethyl glycol acetate, butyl glycol acetate and 3-methoxy-n-butyl acetate; cyclic carbonates; such as, for example, propylene carbonate; cyclic esters, such as, for example, γ-butyrolactone, and also, for example, dimethylformamide, N,N-dimethylacetamide and N-methylpyrrolidone. In addition, aromatic solvents can also be used, optionally in combination with the said solvents.

The organic solvents can be partially replaced by extenders. Preferably, either pure solvent or a pure solvent mixture or solvents containing up to 40% by weight, with respect to the total weight of component d), of extenders are used. Examples of suitable extenders are xylene, Solventnaphtha®, toluene, ethylbenzene, cumene, benzene homologs, various Solvesso® and Shellsol® grades and Deasol®.

The wire coatings according to the invention contain 0.1 to 3% by weight, with respect to the total weight of the wire coating including the catalyst, of a transesterification catalyst, preferably a titanate catalyst (component c)), such as, for example, tetraalkyl titanates, for example tetraisopropyl titanate, tetrapropyl titanate, tetrabutyl titanate, tetraamyl titanate, tetrahexyl titanate, tetraethyl titanate, tetramethyl titanate or diisopropyl dibutyl titanate, or aryl titanates, such as tetraphenyl titanate, tetracresyl titanate, tetraxylenyl titanate or also triethanolamine titanate. Crosslinking catalysts which are also suitable are heavy metal salts, such as lead acetate, zinc acetate, cerium compounds and also organic acids, such as, for example, p-toluenesulfonic acid.

Advantageously, the wire coatings according to the invention contain 0.2 to 5.0% by weight of a flow-promoting phenol-formaldehyde resin e), with respect to the total weight of the wire coating including component e).

Suitable phenolic resins are known condensation products of phenol, substituted phenols or bisphenol A with formaldehyde. The properties of the phenolic resins depend on the nature of the phenol component and of the aldehyde component, of the value to which the pH is adjusted during the preparation and on the ratio of the two reactants. According to the present invention, the phenolic resins can also be modified by incorporation of other compounds during the polycondensation reaction as well as by subsequent modification of the phenolic resin and different control of the reaction process. Of course, in addition to the condensation products with formaldehyde, those with other aldehydes can also be used.

It is furthermore advantageous that the wire coatings according to the invention contain up to 0.3% by weight of imidazole or of an imidazole derivative f), with respect to the total weight of the wire coatings including the component f). Suitable imidazole derivatives are, for example, methylimidazole and 1,2-dimethylimidazole. In addition, it is preferred that the wire coatings contain up to 0.3% by weight of a tertiary amine g), with respect to the total weight of the wire coating including g). Suitable tertiary amines are N-methylmorpholine, N-methylpyrrolidine, N-methylpyrrole, trimethylamine, triethylamine, dimethylethanolamine, diethylmethylamine, methyldiethanolamine, ethylmethylethanolamine, dimethylethylamine, dimethylpropylamine, dimethyl3-hydroxy-1-propylamine, dimethylbenzylamine, dimethyl-2-hydroxy-1-propylamine, dimethyl-1-hydroxy-2-propylamine and 1,4-diazabicyclo[2.2.2]octane.

In addition, the wire coatings can also contain conventional auxiliaries and additives in the customary amounts, preferably up to 1% by weight, with respect to the total weight of components a) and b). Examples of auxiliaries which can be used for the wire coatings are flow-promoting melamine resins or flow agents based on polyacrylates.

Wire coatings according to the invention which contain a) 28 to 47% by weight of the THEIC polyester, b) 4 to 10% by weight of a bismaleimide resin, c) 0.3 to 1.5% by weight of a titanate catalyst, d) 40 to 67% by weight of organic solvents, e) 0.4 to 4.0% by weight of a phenol-formaldehyde resin, f) 0.01 to 0.2% by weight of imidazole and/or of an imidazole derivative and g) 0.01 to 0.2% by weight of a tertiary amine, with respect to the total weight of the wire coating, which is 100% by weight, lead to coatings which have particularly good properties.

The present invention also relates to a process for the preparation of the wire coatings described above, which is characterized in that the polyester component a), the bismaleimide resin b), the catalyst c), organic solvent d), optionally the phenolic resin component e), optionally the imidazole or the imidazole derivative f), optionally the tertiary amine g) and also further auxiliaries and additives are processed by mixing and, where appropriate, dispersing to give a wire coating composition.

In this context, a process for the preparation of the wire coatings according to the invention is preferred which is characterized in that the THEIC-modified polyester a) is dissolved in an organic solvent, the bismaleimide resin b) is added, either in the form of a solid or in organic solution, to the polyester resin solution and the components c), optionally d), optionally e), optionally f) and optionally g), as well as further auxiliaries and additives are added. If appropriate, the viscosity is then also adjusted to the desired value using additional solvent.

Modifications of this preparation process are also possible. Thus, for example the THEIC polyester a) can be dissolved together with the bismaleimide resin.

The wire coatings are applied and cured using conventional wire coating machines. The particular coating film thickness required is built up by at least 1 to up to 10 individual applications, each individual coating application being completely cured bubble-free before applying a fresh coating. Conventional coating machines operate at take-off speeds of 5 to 180 m/min, depending on the binder base of the coating composition and depending on the thickness of the wire to be coated. Typical oven temperatures are between 300 and 550° C. Wire coating machines of this type are known and therefore do not need to be explained in more detail here.

The wire coatings according to the invention are surprisingly stable on storage although they contain such diverse components as THEIC polyester, bismaleimide resins, titanates and optionally phenolic resins. The wire coating coverings obtained from the coatings according to the invention after coating and stoving have very good adhesion to copper wires although—as is shown below—bismaleimide resins on their own, that is to say without the polyester component a), lead to non-adherent coatings. Surprisingly, it has been found that the wire coatings resulting from the coatings according to the invention have an exceptionally good spectrum of properties. Thus, the wires coated with the coatings according to the invention show, in particular, outstanding results with respect to thermal shock.

The invention is illustrated in more detail below with reference to illustrative embodiments.

A) Preparation of a THEIC polyester resin

A polyester resin having a hydroxyl number of 90 to 140 mgKOH/g is prepared from 125.84 g of ethylene glycol, 294.92 g of tris-2-hydroxyethyl isocyanurate, 578.57 g of dimethyl terephthalate and 0.68 g of butyl titanate by heating to 200° C. This THEIC-modified polyester resin is used in the following illustrative embodiments.

B) Preparation of a THEIC polyester coating 355.60 g of the THEIC-modified polyester prepared under A) are dissolved in 264.80 g of cresol at 150° C. with stirring. After cooling to room temperature, 15.00 g of butyl titanate, 54.30 g of Solventnaphtha and 42.62 g of a commercially available phenolic resin are added and the mixture is diluted with 214.4 g of cresol and 53.54 g of Solventnaphtha. Viscosity (23° C.): 540 mPas Solids content (1 g, 1 h, 180° C.): 39.8%.

C) Preparation of a bismaleimide resin coating 253.33 g of cresol are added to 366.12 g of a bismaleimide resin based on monomeric bismaleimides and aminophenols and the mixture is stirred at room temperature until all of the bismaleimide resin has dissolved. After adding 0.62 g of 1,2-dimethylimidazole, 126.78 g of solventnaphtha and 253.15 g of cresol, the coating is stirred for 6 hours and then filtered. Viscosity (23° C): 546 mPas Solids content (1 g, 1 h, 180° C.): 37.6%.

EXAMPLE 1

37.04 g of a bismaleimide resin based on monomeric bismaleimides and aminophenols and 0.04 g of 1,2-dimethylimidazole are added at room temperature, with stirring, to 925.89 g of the THEIC-modified polyester resin coating prepared under B). After adding 27.77 g of cresol and 9.26 g of Solventnaphtha, the coating is stirred for 6 hours and then filtered. Viscosity (23° C.): 640 mPas Solids content (1 g, 1 h, 180° C.): 40.6%

EXAMPLE 2

71.42 g of a bismaleimide resin based on monomeric bismaleimides and aminophenols and 0.07 g of 1,2-dimethylimidazole are added at room temperature, with stirring, to 892.79 g of the THEIC-modified polyester resin coating prepared under B). After adding 26.79 g of cresol and 8.93 g of Solventnaphtha, the coating is stirred for 6 hours and then filtered. Viscosity (23° C.)=815 mPas Solids content (1 g, 1 h, 180° C.): 41.1%

EXAMPLE 3

81.80 g of a bismaleimide resin based on monomeric bismaleimides and aminophenols are dissolved in 75.00 g of cresol and 24.99 g of Solventnaphtha. The viscosity of this solution is 630mPas at 23° C. The solution is added, with stirring, at room temperature to 818.05 g of the THEIC-modified polyester coating prepared under B). After adding 0.16 g of 1,2-dimethylimidazole, the coating is stirred for 2 hours and then filtered. Viscosity (23° C.): 540 mPas Solids content (1 g, 1 h, 180° C.): 39.6%

EXAMPLE 4

97.61 g of a bismaleimide resin based on monomeric bismaleimides and aminophenols are dissolved in 23.76 g of cresol at 75° C., with stirring. The viscosity of the solution is 35 Pas at 23° C. After cooling to 50° C., 813.38 g of the polyester coating prepared under B), 0.12 g of 1,2-dimethylimidazole, 48.86 g of cresol and 16.29 g of solventnaphtha are added and the coating is stirred for 2 hours and then filtered. Viscosity (23° C.): 695 mPas Solids content (1 g, 1 h, 180° C.): 41.2%

EXAMPLE 5

139.35 g of a bismaleimide resin based on monomeric bismaleimides and aminophenols are dissolved in 33.93 g of cresol at 75° C., with stirring. After cooling to 50° C., 696.77 g of the THEIC-modified polyester coating prepared under B), 0.14 g of 1,2-dimethylimidazole, 97.37 g of cresol and 32.44 g of solventnaphtha are added. The resulting coating is stirred for 2 hours and then filtered. Viscosity (23° C.): 650 mPas Solids content (1 g, 1 h, 180° C.): 40.5%.

The coatings prepared under B) and C) and in Examples 1 to 5 are applied as coatings in a standard wire coating machine. Coating conditions: KLH oven, Aumann Length: 4 m Temperature: 500° C. Application system: pump+felt Wire diameter: 0.71 mm Take-off speed: 28 m/min Number of passes: 8 Degree of increase: 2 L The coated wires are tested in accordance with IEC 851. The results are summarized in the following Table:

| Example | B (Comparison example) | C (Comparison example) | 1 | 2 | 3 | 4 | 5 |
|---|---|---|---|---|---|---|---|
| Color shade | red-brown | light brown | red-brown | dark brown | ruby | dark brown | dark brown |
| Surface | good | good | good | good | very good | very good | very good |
| Adhesion on winding, 1 × d + pre-expansion | 25% | no adhesion on the wire | 25% | 25% | 25% | 25% | 10% |
| Thermal shock 1 × d, 30 min | 155° C. | | 155° C. | 200° C. | 185° C. | 220° C. | 220° C. |
| Thermal pressure | 420° C. | | 440° C. | 430° C. | 440° C. | 450° C. | 450° C. |
| tg s | 124° C. | | 138° C. | 142° C. | 146° C. | 137° C. | 136° C. |

-continued

| Example | B (Comparison example) | C (Comparison example) | 1 | 2 | 3 | 4 | 5 |
|---|---|---|---|---|---|---|---|
| steep rise Hardness | 3–4 H | | 4 H | 4 H | 4–5 H | 4–5 H | 4–5 H |

The wire coated with a THEIC polyester coating (Comparison example B) is distinguished by very good adhesion on winding 1×d with a pre-expansion of 25%. A relatively weak thermal shock 1×d of 155° C. is a disadvantage.

The bismaleimide resin coating described under C) has no adhesion to copper wires.

The wire coatings according to the invention prepared in Examples 1–5 have a good adhesion to the copper wire which corresponds to the standard. The surface quality of the coated wires and the hardness of the coating film are in some cases superior compared with conventional THEIC polyester-coated wires.

However, the wire coatings according to the invention are distinguished in particular by the fact that the wires coated therewith have a thermal pressure of 430°–450° C. and a thermal shock, 1×d of up to 220° C. The tan S steep rise is between 136° C. and 146° C.

We claim:

1. A wire coating comprising polyester based on tris-2-hydroxyethyl isocyanurate, organic solvents, catalysts, auxiliaries and additives, characterized in that they coating comprises
   a) 20 to 50% by weight of a polyester based on tris-2-hydroxyethyl isocyanurate which has a hydroxyl/carboxyl groups ratio of 1.1:1 to 2.0:1,
   b) 2 to 35% by weight of a bismaleimide resin, which is prepared from
   A) a bismaleimide of the formula

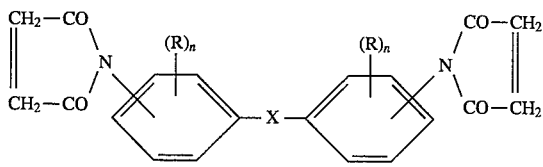

where
   X=CH$_2$, O or SO$_2$,
   R=C$_1$–C$_4$-alkyl, and
   n=0, 1 or 2, 1 and
   B an aminophenol of the formula

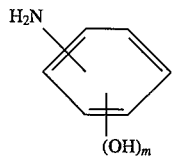

where m=1 or 2, in a molar ratio of A):B) of 2.4:1 to 1.4:1, A) and B) prereacting to form a prepolymer, and also, optionally,
   C) 0 to 2% by weight, with respect to A)+B), of a secondary or tertiary amine or phosphine as addition catalyst,
   D) 0 to 1% by weight, with respect to A)+B), of a polymerization inhibitor,
   E) 0 to 25% by weight, with respect to A)+B), of a copolymerizable vinyl compound or allyl compound,
   F) 0 to 25% by weight, with respect to A)+B), of an epoxide resin containing at least 2 epoxide groups, and
   G) 0 to 2% by weight, with respect to A)+B), of a peroxide initiator,
   70 to 90 mol-% of A) and 30 to 60 mol-% of B) being present in unreacted form and the remaining residue having reacted to form the prepolymer,
   c) 0.1 to 3% by weight of a catalyst,
   d) 35 to 77% by weight of organic solvents,
   e) optionally, 0.2 to 5.0% by weight of a phenolic resin,
   f) optionally, up to 0.3% by weight of imidazole or an imidazole containing compound and
   g) optionally, up to 0.3% by weight of a tertiary amine, with respect to the total weight of the wire coating, which is 100% by weight.

2. A wire coating according to claim 1, comprising
   a) 28 to 47% by weight of component a),
   b) 4 to 10% by weight of component b),
   c) 0.3 to 1.5% by weight of a titanate catalyst,
   d) 40 to 67% by weight of component d),
   e) 0.4 to 4.0% by weight of a phenol-formaldehyde resin,
   f) 0.01 to 0.2% by weight of component f) and
   g) 0.01 to 0.2% by weight of component g).

3. A wire coating according to claim 1, wherein component a) is prepared from ethylene glycol, tris-2-hydroxyethyl isocyanurate and dimethyl terephthalate and has a hydroxyl number from 80 to 150 mg KOH/g.

4. A process for the preparation of a wire coating composition comprising
   a) 20 to 50% by weight of a polyester based on tris-2-hydroxyethyl isocyanurate which has a hydroxyl/carboxyl groups ratio of 1.1:1 to 2.0:1,
   b) 2 to 35% by weight of a bismaleimide resin, which is prepared from
   A) a bismaleimide of the formula

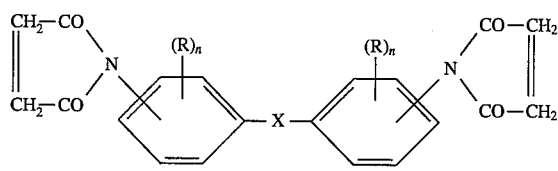

where
   X=CH$_2$, O or SO$_2$,
   R=C$_1$–C$_4$-alkyl, and
   n=0, 1 or 2, and

B) an aminophenol of the formula

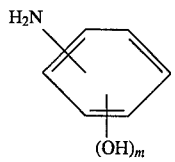

where m=1 or 2, in a molar ratio of A):B) of 2.4:1 to 1.4:1, A) and B) prereacting to form a prepolymer, and also, optionally, C) 0 to 2% by weight, with respect to A)+B), of a secondary or tertiary amine or phosphine as addition catalyst, D) 0 to 1% by weight, with respect to A)+B), of a polymerization inhibitor, E) 0 to 25% by weight, with respect to A)+B), of a copolymerizable vinyl compound or allyl compound, F) 0 to 25% by weight, with respect to A)+B), of an epoxide resin containing at least 2 epoxide groups, and G) 0 to 2% by weight, with respect to A)+B), of a peroxide initiator, 70 to 90 mol-% of A) and 30 to 60 mol-% of B) being present in unreacted form and the remaining residue having reacted to form the prepolymer, c) 0.1 to 3% by weight of a catalyst, d) 35 to 77% by weight of organic solvents, e) optionally, 0.2 to 5.0% by weight of a phenolic resin, f) optionally, up to 0.3% by weight of imidazole or imidazole containing compound and g) optionally, up to 0.3% by weight of a tertiary amine, with respect to the total weight of the wire coating, which is 100% by weight, said process comprising the steps of mixing components a)–g), where components a) and b) are mixed at room temperature, and optionally dispersing to give a wire coating composition.

5. The wire coating composition of claim 1, wherein the imidazole containing compound (f) is selected from the group consisting of methylimidazole and 1,2-dimethylimidazole.

6. The process of claim 4, wherein the imidazole containing compound (f) is selected from the group consisting of methylimidazole and 1,2-dimethylimidazole.

7. A process for the preparation of a wire coating composition comprising a) 20 to 50% by weight of a polyester based on tris-2-hydroxyethyl isocyanurate which has a hydroxyl/carboxyl groups ratio of 1.1:1 to 2.0:1, b) 2 to 35% by weight of a bismaleimide resin, which is prepared from A) a bismaleimide of the formula

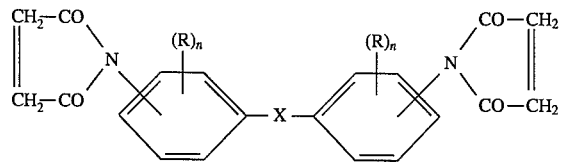

where
X=$CH_2$, O or $SO_2$,
R=$C_1$–$C_4$-alkyl, and
n=0, 1 or 2, and

B) an aminophenol of the formula

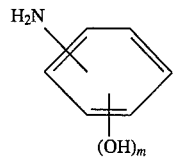

where m=1 or 2, in a molar ratio of A):B) of 2.4:1 to 1.4:1, A) and B) prereacting to form a prepolymer, and also, optionally, C) 0 to 2% by weight, with respect to A)+B), of a secondary or tertiary amine or phosphine as addition catalyst, D) 0 to 1% by weight, with respect to A)+B), of a polymerization inhibitor, E) 0 to 25% by weight, with respect to A)+B), of a copolymerizable vinyl compound or allyl compound, F) 0 to 25% by weight, with respect to A)+B), of an epoxide resin containing at least 2 epoxide groups, and G) 0 to 2% by weight, with respect to A)+B), of a peroxide initiator, 70 to 90 mol-% of A) and 30 to 60 mol-% of B) being present in unreacted form and the remaining residue having reacted to form the prepolymer, c) 0.1 to 3% by weight of a catalyst, d) 35 to 77% by weight of organic solvents, e) optionally, 0.2 to 5.0% by weight of a phenolic resin, f) optionally, up to 0.3% by weight of imidazole or imidazole containing compound and g) optionally, up to 0.3% by weight of a tertiary amine, with respect to the total weight of the wire coating, which is 100% by weight, said process comprising the steps of mixing components a) wherein components a), and b) are mixed at a temperature of 50° C. and optionally dispersing to give a wire coating composition.

* * * * *